United States Patent [19]
Wickes

[11] 4,209,099
[45] Jun. 24, 1980

[54] KIT FOR CLOSET SUPPORTS

[76] Inventor: Robert R. Wickes, 4237 E. Keim Dr., Paradise Valley, Ariz. 85253

[21] Appl. No.: 881,751

[22] Filed: Feb. 27, 1978

[51] Int. Cl.² ............................................. A47F 5/13
[52] U.S. Cl. ............................... 211/182; 211/105.3; 211/123; 211/206
[58] Field of Search ................. 211/182, 123, 189, 86, 211/87, 90, 186, 187, 134, 105.1, 105.3, 206, 189; 108/29, 30; 248/201, 205 R, 235, 251

[56] References Cited
U.S. PATENT DOCUMENTS

| | | | |
|---|---|---|---|
| 1,015,448 | 1/1912 | Madden | 211/206 X |
| 1,643,649 | 9/1927 | Thompson | 403/199 X |
| 3,357,374 | 12/1969 | Smith et al. | 211/105.1 X |
| 3,462,021 | 8/1969 | Hawke et al. | 211/182 |
| 3,538,842 | 11/1970 | Labbato | 108/29 |
| 3,638,814 | 2/1972 | Lowery | 211/189 |
| 3,760,329 | 9/1973 | Stepan | 339/177 R X |
| 3,834,549 | 9/1974 | Burg et al. | 211/182 X |
| 3,845,453 | 10/1974 | Hemmer | 339/177 R X |
| 3,999,727 | 12/1976 | Rennemann | 211/182 X |

FOREIGN PATENT DOCUMENTS

| | | | |
|---|---|---|---|
| 526717 | 6/1956 | Canada | 211/182 |
| 636426 | 2/1962 | Canada | 211/105.3 |

OTHER PUBLICATIONS

AMP Terminal and Connector Handbook, 1967, 1970, p. 301, Standard High Voltage Coaxion Connector.

*Primary Examiner*—Ramon S. Britts
*Attorney, Agent, or Firm*—Don J. Flickinger

[57] ABSTRACT

A kit for increasing the usable space of a closet by providing supports from which garments or comparable items are suspended. The kit comprises bars which may assume either horizontal or vertical positions in a closet, with each bar consisting of a pair of telescopic cylindrical tubes. Also included in the kit are a plurality of connectors, some of which are end connectors which connect one or both ends of a bar to spaced vertical wall or to opposed horizontal surfaces such as a floor, ceiling or shelf. These connectors maintain the tubes in assembled relation. Intersection connectors establish joints between intersecting bars. Each end connector includes at least one pair of concentric radially spaced nipples, each presenting an inner and an outer surface. The inner surface of the outer nipple snugly receives the outer surface of the outer tube and the inner surface of the inner tube is accurately fitted about the outer surface of the inner nipple. Some intersection connectors are designed to receive two bars and some to receive three bars. Said connectors are dimensioned to receive the larger or outer tube, while a shim is provided if the connector is to receive the smaller or inner tube. These intersection connectors are retained in effective position on the bars by any desired means.

5 Claims, 16 Drawing Figures

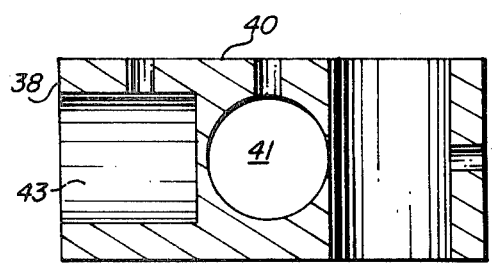
FIG.-5
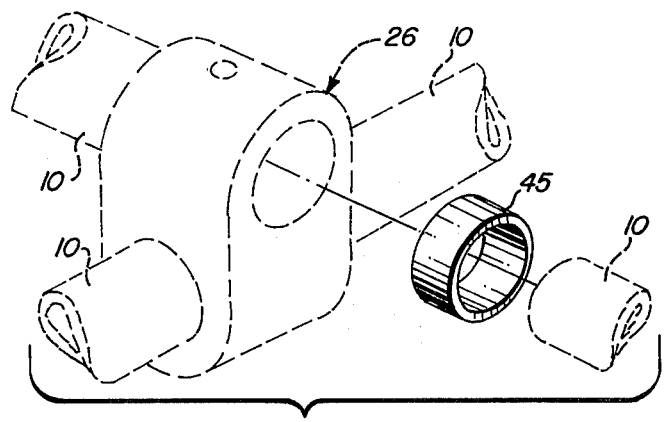
FIG.-11
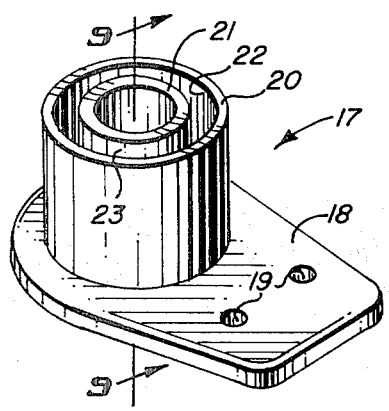
FIG.-6
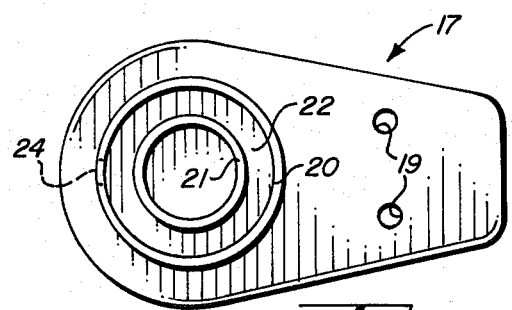
FIG.-7
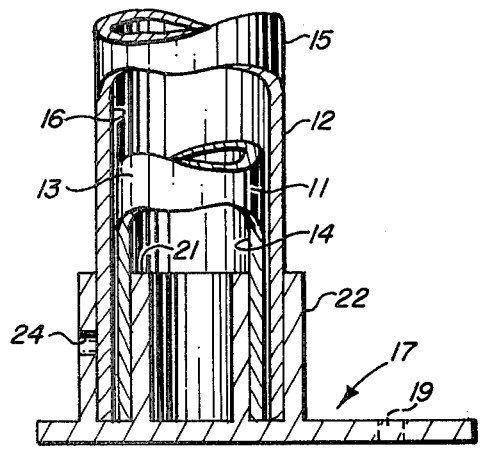
FIG.-9
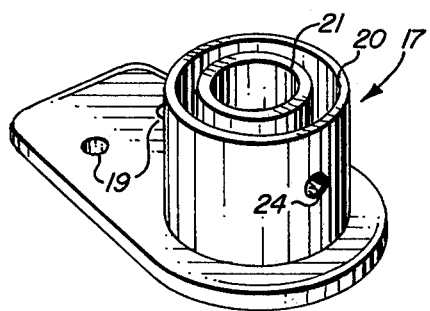
FIG.-8
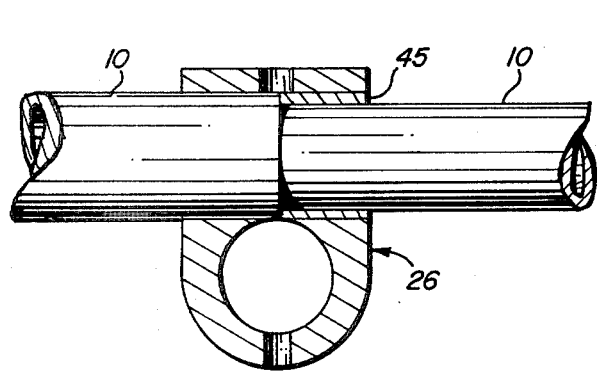
FIG.-10
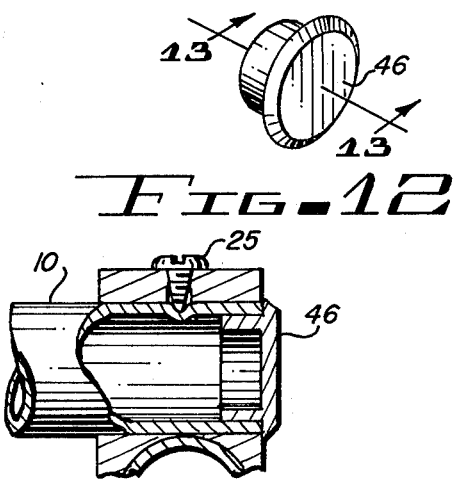
FIG.-12
FIG.-13

KIT FOR CLOSET SUPPORTS

The present invention relates to a kit for closet supports and is concerned primarily with such a kit, which, when erected in a closet, increases the usable space for the accommodation of garments suspended from supports.

BACKGROUND OF THE INVENTION

Before preparing this application for filing in the U.S. Patent and Trademark Office, a patentability search was conducted on the concept of providing a kit for a closet which increases the usable space in which garments are suspended from horizontal rods. This search brought to light the following patents which are believed to come closest to this concept:

U.S. Pat. No. 0,455,725—Redding
U.S. Pat. No. 2,043,036—Duncan
U.S. Pat. No. 3,834,549—Burg et al.
U.S. Pat. No. 0,793,017—French Brief comment is made on the disclosures of these patents as follows:

Redding

This reference relates to a temporary installation of a wardrobe within a living space. The purpose is the creation of a wardrobe rather than more efficient utilization of a pre-existing closet space. Also, it should be noted that this is a compact portable unit of limited variation.

Duncan

This patent relates to temporary garment display racks, and is primarily concerned with compact storage when not in use and with providing a variety of assembled configurations in order to more efficiently display goods. With the exception of a floor, pre-existing structures are not utilized by this device.

Burg et al

This is principally a shelf component supportive system, conceived for use in living space and possible commercial applications. The load carrying supports for this system are vertical, depending upon a horizontal surface, such as a floor, to bear the load, with no consideration given to the potential use of vertical surfaces for this same function. For further stability, another horizontal surface, such as a ceiling, is employed. Cube-shaped connectors are utilized, of such a design as to diminish usable space and to require specially cut shelving or shelving considerably smaller in size from that which would be desirable in order to maximize the available surface area of such a system. Also, the cubic connectors are of an embodiment inherently prohibiting the passage of a vertical or horizontal rod therethrough. Greater strength at an intersection point could be gained if as many as possible of the horizontal rods at that junction were continuous, thus the connection would provide basically a binding effect, rather than a load-carrying effect.

French

Ths object of this device is to provide a temporary, versitile display structure. As may be seen by the connectors utilized, no thought was given to the end of having a permanent or even semi-permanent structure.

The following patents were also noted as having some bearing on the abstract concept, but are not believed to be as pertinent to the present device as those described above:

U.S. Pat. No. 0.772,020—Baruch
U.S. Pat. No. 0.832,625—Ryan
U.S. Pat. No. 0,844,687—Miller et al Apparently, much thought has been given to the use of open living space for storage. The concept of an essentially free standing device for the containment of articles of clothing and other objects is well known. However, little consideration has been devoted to a more efficient utilization of present closet space. It would be desirable, therefore, to provide a kit yielding an easily installed permanent or semi-permanent highly flexible, variable, and versatile structure to decrease the extent of wasted closet space.

OBJECTS OF THE INVENTION

With the foregoing conditions in mind, the invention has in view the following objectives:

1. To provide in a kit of the character aforesaid, components which could be used for the construction of a structure within a closed space, as in a closet, for more efficient utilization of said space.

2. To provide in a kit of the type described, components which could be used to construct a variety of structures, thus possessing great flexibility and versatility.

3. To provide in a kit of the kind noted, vertical and horizontal supportive bars, comprising radially spaced cylindrical tubes.

4. To provide in a kit of the character described, end connectors with means for attachment to horizontal or vertical supportive surfaces, and radially spaced nipples dimensioned to receive and retain either or both said tubes.

5. To provide in a kit of the type described, intersection connectors dimensioned to receive the larger of the radially spaced cylindrical tubes.

6. To provide in a kit of the kind noted an intersection connector capable of bonding together two mutually perpendicular supportive bars.

7. To provide in a kit as noted an intersection connector capable of bonding together three mutually perpendicular supportive bars.

8. To provide in a kit of the character aforesaid, a shim or spacer, thus allowing the smaller of the radially spaced cylindrical tubes to more closely match the outer dimension of the larger tube when received into an intersection connector.

SUMMARY OF THE INVENTION

The foregoing objects are achieved by providing a kit comprising a multiplicity of supportive bars, comprising telescopic cylindrical tubes with inner and outer surfaces. A plurality of end connectors, each comprising a plate which may be mounted to a vertical or horizontal surface by any conventional means.

Further, said plates carry radially spaced nipples, each having inner and outer surfaces. The outer surface of the outer cylindrical tube is dimensioned to be snugly received by the inner surface of a larger nipple and the inner surface of the inner cylindrical tube is of a size to snugly receive the outer surface of a smaller nipple.

Also, a component of said kit is a plurality of intersection connectors capable of bonding together two mutually perpendicular supportive bars and having passages dimensioned to receive the larger or outer cylindrical tubes.

Another component is a plurality of intersection connectors capable of bonding together three mutually perpendicular supportive bars and having two passages dimensioned to receive the larger or outer cylindrical tubes and a socket terminating in said connector. This socket is also of a size to receive the larger cylindrical tubes.

A plurality of shims are sized to fit over the smaller or inner cylindrical tubes, thus increasing the effective outside diameter of said tubes to more closely match that of the outer cylindrical tubes and also the diameter of the passages and the socket of the intersection connectors.

Finally, means are provided in all connectors for the retention of said connectors to the supportive bars, such as set or sheet metal screws.

For a full and more complete understanding of the invention, reference may be had to the following description and accompanying drawings, wherein:

FIG. 5 is a section of the connector of FIG. 4 as taken about on the plane of the line 5—5 of FIG. 4;

FIG. 6 is a perspective of an end connector;

FIG. 7 is an elevation of an end connector;

FIG. 8 is another perspective of the end connector shown in FIG. 6;

FIG. 9 is a section of the end connector of FIGS. 6 and 8 as taken about on the plane of the line 9—9 of FIG. 6. For the purpose of illustration, both tubes of a supportive bar are shown, intalled in said connector;

FIG. 10 is a view, partially in section and partly in elevation, of a two supportive bar intersection connector, illustrating the relation positions of outer and inner cylindrical tubes and a shim therein;

FIG. 11 is a perspective of a two supportive bar intersection connector and a shim with the connector and bars in phantom and all of the elements in exploded relation;

FIG. 12 is a perspective of a decorative cap;

FIG. 13 is a section of an intersection connector, illustrating one method of retaining a tube end in a connector and a decorative cap.

Figure 1:
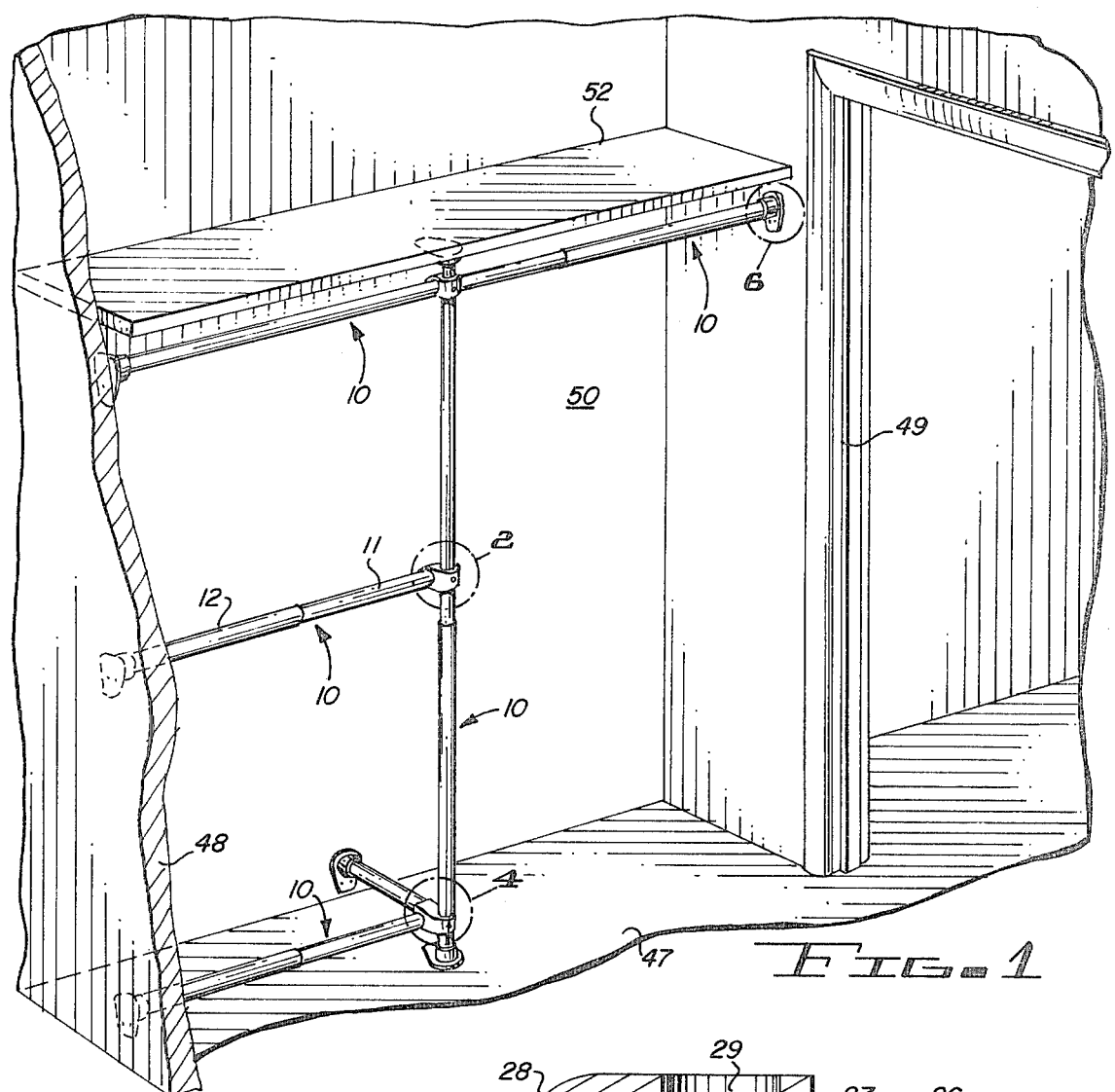
FIG. 1 is a perspective of a closet structure illustrating the utilization of the kit of this invention.
Figure 3:
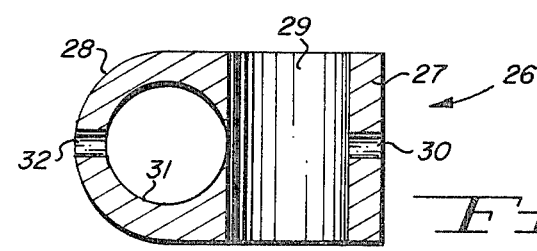
FIG. 3 is a section of the connector of FIG. 2 as taken about on the plane of the line 3—3 of FIG. 2.

Referring now to the drawings, wherein like reference characters denote corresponding elements throughout the several views, the invention will be described by first setting out in detail the elements of the kit. Permanent closet structures will then be described and several applications of the elements of the kit to the closet structures.

The Kit

A plurality of supportive bars are illustrated in FIG. 1 and each is identified in its entirely by the reference character 10. Each bar 10 comprises an inner cylindrical tube 11, which is snugly and telescopically received in an outer cylindrical tube 12. Inner tube 11 has an outer surface 13 and an inner surface or bore 14 and is best depicted in FIG. 9. Outer tube 12 has an outer surface 15 and a bore 16.

Each of a plurality of end connectors, designated generally 17, are illustrated in FIGS. 6, 7 and 8. Each end connector 17 consists of a plate or tab 18 having a pair of orifices 19 and from a face of which extends an outer nipple 20, and an inner nipple 21. Said nipples 20 and 21 are radially spaced apart. Connector 17 may be made from any of several materials ahving the required strength and rigidity. Thus, they may be made of plastic which would facilitate forming the nipples 20 and 21 integrally with the plate 18. They could also be made of metal.

Figure 2:
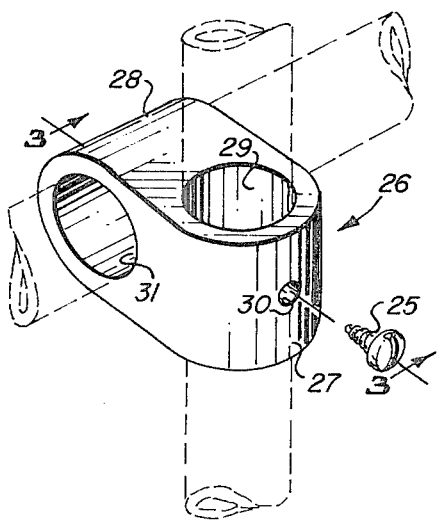
FIG. 2 is a perspective of an intersection connector applied to two bars, illustrated in broken lines.

Outer nipple 20 has a bore 22, while the inner nipple 21 has an outer surface 23. The outer nipple 20 has an aperture 24 which accommodates a screw or a sheet metal screw such as at 25 in FIG. 2.

Two forms of intersection connectors are included in the kit. The first connector, designated generally 26, bonds two bars together, as illustrated in FIGS. 2, 3, 10 and 11. Each connector 26 comprises two generally semi-cylindrical portions 27 and 28, which are normal to each other and which are integrally united. Portion 27 is formed with a cylindrical through passage 29 and an aperture 30 which opens onto passage 29 and receives a screw 25. Portion 28 has another through passage 31 and another aperture 32 for a screw 25. The axes of passages 29 and 31 are in normal relation with respect to each other.

Figure 4:
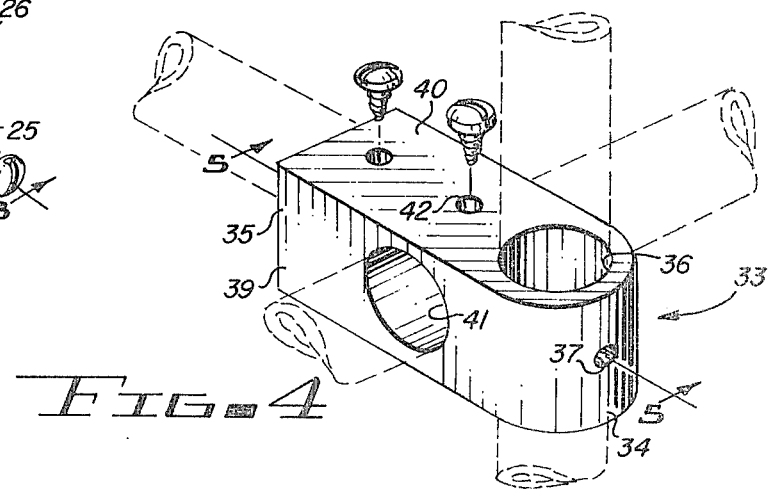
FIG. 4 is a perspective of an intersection connector for three bars depicted in broken lines.

The second type of intersection connector, designated generally 33, bonds three bars together and is shown in FIGS. 4 and 5. Connector 33 comprises a semi-cylindrical end portion 34, integral with a rectangularly shaped portion 35. Cylindrical portion 34 has a through passage 36 onto which opens an aperture 37 which receives a screw 25. Rectangular portion 35 has an end face 38, opposed side faces 39, an aperture 42, opening onto top face 40 and passage 41. Aperture 42 is adapted to receive screw 25. Extending into portion 35 from end face 38 is a cylindrical socket 43, as shown in FIG. 5. Another aperture 44 extends from top face 40 to socket 43 and receives a screw 25. The axes of passages 36 and 41 and socket 43 are each in normal relation with respect to each other.

A shim 45, as illustrated in FIGS. 10 and 11, may be used with the connectors 26 and 33. The decorative cap 46 is used with the bar 10 and is illustrated in FIGS. 12 and 13.

The Permanent Closet Structure

As illustrated in FIG. 1, a permanent closet structure includes a horizontal floor 47, from which upstand a pair of spaced apart parallel vertical walls 48 and 49 and another vertical wall 50, also vertical and normal to walls 48 and 49. A ceiling (not illustrated) extends between the top edges of vertical walls 48, 49 and 50 and is parallel to the floor 47. A shelf 52 is located at a convenient height above the floor 47 and is parallel thereto.

Figure 14:
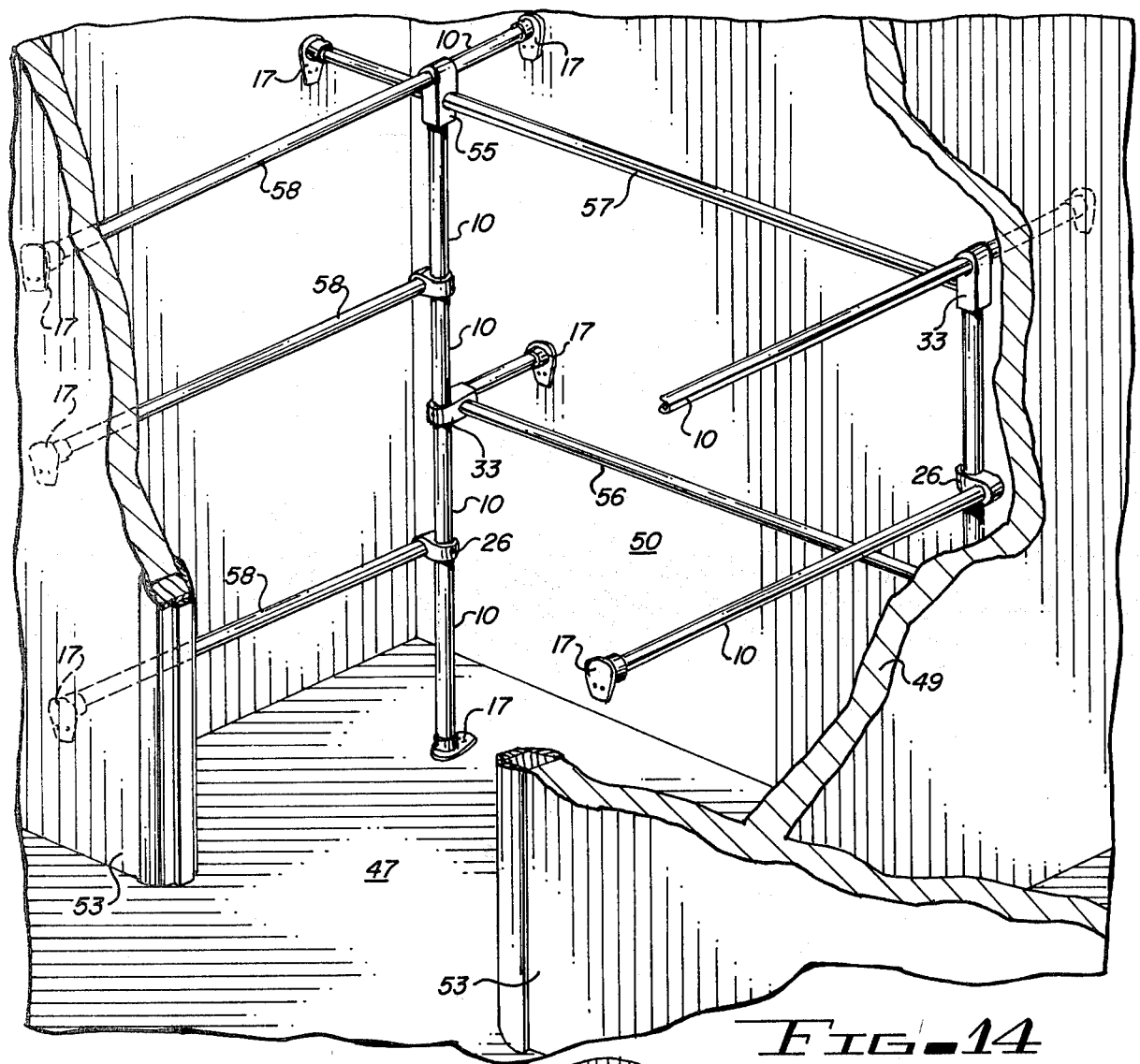
FIGS. 14, 15 and 16 are perspective views of some of the structures obtained with the kit of this invention.

FIG. 14 shows a closet of a construction which is slightly different from that depicted in FIG. 1. It includes the floor 47 and the vertical walls 48, 49 and 50 of FIG. 1, but, in addition has a vertical wall 53 which is spaced from and parallel to the wall 50.

The Application of the Kit to the Closet Structure

FIGS. 1, 14, 15 and 16 are all views of some of the constructions which could be built with this kit.

The construction of FIG. 1 originates with a pair of clothes closet bars 10. An end connector 17 is affixed to the wall 49 by some desired means, such as adhesives to bond the plate 18 to the wall 49 or by using screws which pass through the orifices 19. A second end connector 17 is attached to the opposing wall 48. The axes of the nipples 20 and 21 of both end connectors 17, would, of course, be normal to the walls 48 and 49 and in alignment. A pair of bars 10 are then placed between the end connectors 17 and expanded until the outer surface 15 of the outer tube 12 is snugly received by the bore 22 of the outer nipple 20 of one end connector 17 and the inner surface, or bore 14 of the inner tube 11 snugly encompasses the outer surface 23 of the inner nipple 21 of the opposing end connector 17. If desired, a screw 25 could be inserted into aperture 24 for more positive retention of the tubes 11 or 12 received by the end supports 17.

As a vertical bar 10 is attached to these horizontal bars 10 by a two rod connector 26, it may be placed on the horizontal bar 10 along with a shim 45 if required. This is accomplished by passing an end of the bar 10 through either passage 29 or 31. If passage 29 is so utilized, then a screw 25 is placed into aperture 30 for the more positive retention of the connector 26 at the time when it would be so desired. If the connector 26 is used on an outer tube 12 of the bar 10, then the shim 45 would not be required. If the connector 26 is used on an inner tube 11 of the bar 10, then the shim 45 would be necessary.

A vertical bar 10 is then placed in passage 31 of connector 26 and the connector 26 is slid on horizontal bar 10 until the vertical bar 10 is spaced in the desired position from walls 48 and 49. A shim is used between the vertical bar 10 and the connector 26 within passage 31, if so required. Also, a screw 25 is inserted into the aperture 32 at the time when it is desirable to fix the vertical bar 10 and the connector 26 together.

An end connector 17 is affixed to the underside of the shelf 52 in alignment with the vertical bar 10. The position of the end connector is easily determined from the position of the vertical bar 10. Similarly, another end connector is aligned and affixed to the floor 47. Another connector 26 is placed on vertical bar 10 beneath the first connector 26 by sliding vertical bar 10 through passage 31. A sleeve 45 is used, if so required. Beneath the second connector 26, another connector 33 is similarly placed by sliding vertical bar 10 through passage 36. Again, a sleeve 45 is used if so required. Appropriate screws 25 are installed in apertures 42 and 37 when so desired. Vertical bar 10 is then expanded so that the inner tube 11 engages one end connector 17 and the outer tube 12 engages the other end connector 17 in the manner described in the installation of the vertical bar 10.

It would be desirable at this point to install screws 25 in the aperture 24 of all end connectors 17 and apertures 30 and 32 of the upper connector 26, so as to more positively retain all presently installed bars 10.

Another horizontal bar 10 is now placed in passage 29 of the middle connector 26 and moved into the position desired, spaced above the floor 47 and below the shelf 52. The shim 45 is used if required. Bar 10 is extended so that an end is in close proximity to the wall 48, and the desired position of an end connector 17 may be determined. After attaching the end connector 17 to the wall by appropriate means, the bar 10 is expanded and the tube 11 or 12 engages the appropriate nipple 21 or 20 of the end connector 17. The other tube 11 or 12 which engages connector 26 is positioned so as not to protrude from passage 29. Screws 25 are placed in aperture 24 of end connector 17 and apertures 30 and 32 of connector 26, in order to bond the horizontal bar 10 tightly into current structure. Note that a decorative cap 46 may also be installed in the open end of the bar 10.

Similarly, as above, a horizontal bar 10 is placed into passage 41 of the lower connector 33 and slid on the vertical bar 10 into a desired position above the floor 47 and beneath the priorly installed horizontal bar. A shim 45 is used if so required.

The appropriate end connector position is determined, as above, on the wall 48 and said end connector 17 attached thereto. The rod is expanded into position so that a tube 11 or 12 engages a nipple 21 and 20. The other tube 11 or 12, being received by passage 41 of connector 33, is positioned so as not to protrude from the passage 41. Screws 25 are placed in apertures 24, 37 and 42 of end connector 17 and connector 33 so as to bond the horizontal bar 10 into the current structure. A decorative cap 44 may be installed in the open end of the bar 10.

Another horizontal bar 10 is received into socket 43 of connector 33 and expanded so that the free end is in close proximity to a wall 50. A shim 45 is used, if required. The position of an end connector 17 upon wall 50 is determined and said connector 17 is attached thereto. The bar 10 is then extended so that a tube 11 or 12 engages a nipple 21 or 20. Screws 25 are now installed in apertures 24 and 44 of connectors 17 and 33. The structure is now complete.

Figure 15:
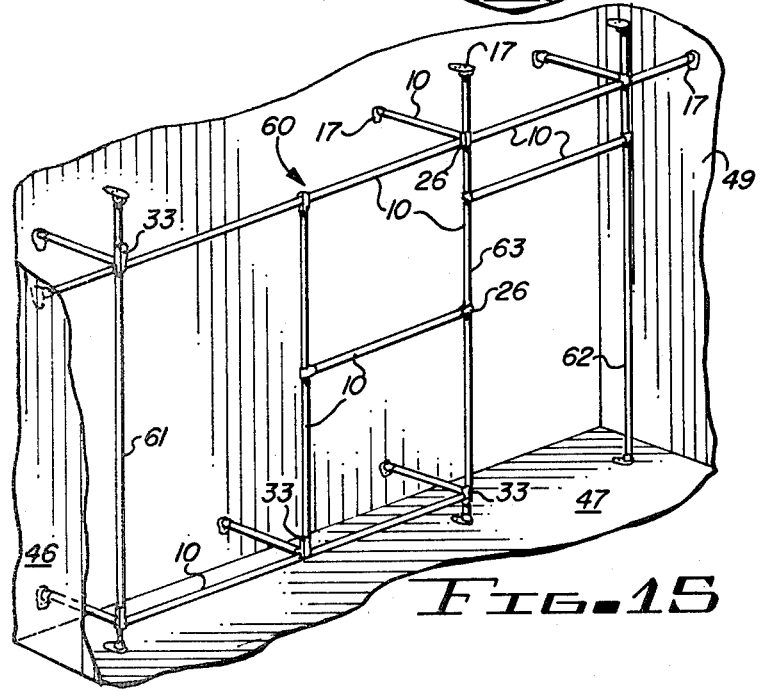
Figure 16:
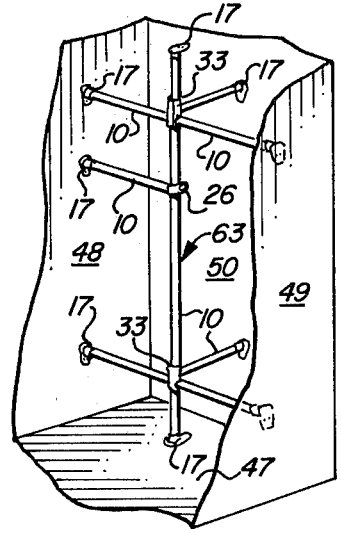

FIGS. 14, 15 and 16 illustrate other structures which could be constructed from this kit.

FIG. 14 discloses a slightly different permanent closet structure and another arrangement of suspension bars mounted thereon. Thus, the closet of FIG. 14 includes the floor 47, opposed walls 48 and 49 and vertical wall 50. Opposite to wall 50 and parallel thereto is another vertical wall 53 that is interupted to provide access to the closet. A pair of vertical posts, each of which is identified in its entirety by the reference character 54, extend from floor 47 to the ceiling (not illustrated).

Each post 54 comprises an end connector 17 at its lower end, a bar 10 affixed to and extending upwardly from connector 17, and intersection connector 26, another bar 10 extending upwardly from connector 26 to another intersection connector 33. From the latter, two bars 10 with an intersection connector 26 between the two extend to an upper terminal connector 55 that is spaced below the ceiling. Another pair of bars 10 are formed to connector 55 and are normal to each other. One of the latter bars 10 is anchored to wall 48 by an end connector 17 and the other to wall 50 by another end connector 17.

Each post 54 includes three intersection connectors. The central connector 33 of these on one post are connected to the central connector 33 of the other post 54 by a horizontal bar 56. Another horizontal bar 57 extends between the terminal connectors 55 of the posts 54. The latter are further supported by a bar 10 which extends from the central intersection connector 33 of each post to an end connector 17 on wall 50.

A top horizontal bar 58 extends from a terminal connector 55 of each post 54 to an end connector 17 on one section of wall 53. Additional horizontal bars 58 extend from the upper and lower connectors 26 of each post 54 to a section of wall 53.

FIG. 15 illustrates a permanent closet construction which is substantially the same as that disclosed in FIG. 1 with the shelf omitted. Thus, it includes floor 47 and vertical walls 48, 49 and 50. An upper horizontal rod is referred to generally at 60. It comprises five bars 10, two end connectors 17 and four intersection connectors 26 and 33. It is supported from wall 50 by three bars 10 which have their ends secured to the outermost of one of the intermediate intersection connectors 33.

And end vertical post 61 extends from an end connector 17 secured to the floor 47 to another end connector 17 attached to the shelf or ceiling. It includes two sections similar to bars 10 which are joined at intermediate connector 33. Another end vertical post is designated generally 62. It is erected in the closet structure in the same manner as post 61. It is of the same construction as post 61, with the exception that a second intersection connector 26 is interposed between top bar 60 and floor 47.

Another vertical post 63, of the same construction as post 62 is installed in the closet in the same manner as described in connection with post 62. A horizontal bar 10 connects the intersection connector 26 of posts 62 and 63. A lower horizontal bar comprises two bars 10 connected by an intersection connector 33 and extends between the two end connectors 17 at the lower ends of posts 61 and 63.

A vertical rod comprises two bars 10 jointed together at an intersection connector 26 and to upper bar 60 and the lower horizontal rod by intersection connectors 33. Another horizontal bar 10 extends between the latter vertical rod and post 63.

FIG. 16 depicts a closet structure comprising floor 47 and vertical walls 48, 49 and 50. It also includes a shelf or ceiling (not illustrated). A vertical post designated generally 64 extends from floor 47 to the shelf or ceiling. It comprises upper and lower end connectors 17, two end bars 10, two intermediate bars 10, and three intersection connectors 33 and 26, the latter of which is a central connector.

A top horizontal bar 10 extends from an end connector 17 on each of walls 48 and 49 to the uppermost intersection connector 33. A lower horizontal bar 10 extends from an end connector 17 on each of walls 48 and 49 to the lowermost intersection connector 33. Another horizontal bar 10 extends from wall 48 to the central intersection connector 26.

Post 64 is also supported from wall 50 by two horizontal bars 10, each of which have one end anchored to wall 50 as the other to an intersection connector 33.

While preferred embodiments of the invention are hereinbefore set forth, it is to be clearly understood that the invention is not to be limited to the exact constructions, materials and devices illustrated and described because various modifications of these details may be made in putting the invention into practice.

What is claimed is:

1. A kit for increasing the number of garments storable in a suspended position in a closet including a substantially horizontal planar floor member, a planar member spaced above and substantially parallel to the floor member, two substantially vertical planar wall members in spaced parallel relation and a third substantially vertical planar wall member extending between and normal to said two parallel wall members comprising:

(a) a plurality of bars, each bar having an outer cylindrical tube having a given inner and a given outer diameter, and an inner cylindrical tube having a given inner and a given outer diameter, said inner cylindrical tube being telescopically received in said outer tube with a snug sliding fit;

(b) a plurality of end connectors, each of said end connectors having a plate having a substantially planar surface adapted to engage a planar member defining said closet, means for securing the planar surface of each end connector to a planar member, each plate of each end connector having inner and outer coaxial cylindrical nipples fixedly secured to said plate, the outside diameter of said inner nipple being dimensioned to be substantially equal to the inner diameter of the inner cylindrical tube of a bar, the inside diameter of the outer nipple being dimensioned to be substantially equal to the outer diameter of the outer cylindrical tube of a bar, whereby the inner and outer tubes of a bar are snugly received on said nipples;

(c) a plurality of two-way intersection connectors, each having a pair of cylindrical passages in normal relationship to each other, the diameter of said passages being made substantially equal to the outer diameter of the outer cylindrical tubes of said bars and means for immovably securing to the connectors tubes of bars inserted into the passages of said two-way connector; and (d) a plurality of three-way intersection connectors, each comprising a body with two cylindrical passages and a cylindrical socket, said passages and socket being normal to each other and having a diameter substantially equal to the outer diameter of the outer cylindrical tubes of the bars and means for immovably securing to the connectors tubes of bars inserted into the passages or socket of said three-way connectors;

(e) said means for securing tubes of bars inserted into passages or sockets of said intersection connectors including a cylindrical shim having an inner and an outer diameter, said inner diameter substantially equaling the outer diameter of the inner cylindrical tubes of said bars and the outer diameter substantially equaling the outer diameter of the outer cylindrical tubes of the bars and adapted to be slid over the inner cylindrical tubes and to be positioned in a passage or socket of a intersection connector when a portion of an inner cylindrical tube is to be secured to such a connector.

2. The kit of claim 1 in which the means for maintaining said bars in position in the connector with which they are assembled includes apertures in the connectors and screws which are threaded into the apertures and engage the tubes to deform portions thereof.

3. The kit of claim 1 together with a closure cap for an open end of one of said tubes.

4. The kit of claim 3 in which said cap comprises an end plate dimensioned to be accurately engaged with a tube end and a sleeve integral with said end plate and snugly received in the bore of the tube engaged by said end plate.

5. In a kit for increasing the number of garments storable in a suspended position within a closet having a substantially vertical wall surface, the combination comprising:

(a) a bar including
        (i) an outer cylindrical tube, and
        (ii) an inner cylindrical tube telescopingly received within said outer cylindrical tube; and
    (b) an end connector including
        (i) a plate adapted to engage said wall surface,
        (ii) an outer nipple carried by said plate and having an inner surface for receiving said outer cylindrical tube, and
        (iii) an inner nipple carried by said plate coaxial with said outer nipple and having an outer surface receivable with said inner cylindrical tube.

* * * * *